US00RE44911E

(19) United States
(12) Reissued Patent
Matsuda et al.

(10) Patent Number: US RE44,911 E
(45) Date of Reissued Patent: May 27, 2014

(54) ELECTRONIC COMPONENT

(75) Inventors: Katsuji Matsuda, Nagaokakyo (JP); Masahiko Kawaguchi, Nagaokakyo (JP)

(73) Assignee: Murata Manufacturing Co., Ltd., Kyoto-fu (JP)

(21) Appl. No.: 13/533,764

(22) Filed: Jun. 26, 2012

Related U.S. Patent Documents

Reissue of:
(64) Patent No.: 7,911,311
Issued: Mar. 22, 2011
Appl. No.: 12/551,031
Filed: Aug. 31, 2009

(30) Foreign Application Priority Data

Sep. 1, 2008 (JP) ..... 2008-223408

(51) Int. Cl.
*H01F 5/00* (2006.01)
*H01F 27/29* (2006.01)
*H01F 27/28* (2006.01)

(52) U.S. Cl.
USPC ..... 336/200; 336/192; 336/223; 336/232

(58) Field of Classification Search
None
See application file for complete search history.

(56) References Cited

U.S. PATENT DOCUMENTS

| | | | |
|---|---|---|---|
| 7,091,816 | B1 | 8/2006 | Ito et al. |
| 7,253,713 | B2 | 8/2007 | Tomonari et al. |
| 7,682,998 | B2 | 3/2010 | Nozaki et al. |
| 7,911,311 | B2 | 3/2011 | Matsuta et al. |
| 2002/0030573 | A1 | 3/2002 | Mori et al. |
| 2002/0125792 | A1 | 9/2002 | Tabota |
| 2003/0052766 | A1 | 3/2003 | Tomohiro et al. |
| 2004/0029701 | A1 | 2/2004 | Chikagawa et al. |
| 2007/0248864 | A1 | 10/2007 | Yoshikata et al. |
| 2008/0100409 | A1 | 5/2008 | Nishikawa et al. |

FOREIGN PATENT DOCUMENTS

| | | | |
|---|---|---|---|
| JP | 54-063300 | A | 5/1979 |
| JP | 04-284611 | A | 10/1992 |
| JP | 2002373810 | A | 12/2002 |
| JP | 2004-040001 | A | 2/2004 |
| JP | 2005-005644 | A | 1/2005 |
| JP | 2005-109083 | A | 4/2005 |
| JP | 2006-140229 | A | 6/2006 |
| JP | 2006-216636 | A | 8/2006 |
| JP | 2006-261580 | A | 9/2006 |
| JP | 2006-286934 | A | 10/2006 |
| JP | 2007-123352 | A | 5/2007 |
| JP | 2007-214448 | A | 8/2007 |

OTHER PUBLICATIONS

Chinese Office Action; Notification of First Examination Opinion; CN200910168680.7; Apr. 26, 2011.
Chinese Office Action; Notice on the Second Office Action; CN200910168680.7; Feb. 21, 2012.
Japanese Office Action; JP2008-223408; Jun. 15, 2010.

*Primary Examiner* — Elvin G Enad
*Assistant Examiner* — Ronald Hinson
(74) *Attorney, Agent, or Firm* — Studebaker & Brackett PC

(57) ABSTRACT

An electronic component is configured to include a laminate disposed between first and second magnetic substrates. The laminate is formed by laminating resin insulating layers, a coil pattern, and a lead pattern. The coil pattern is connected to external electrodes disposed on end surfaces of the laminate by using internal electrodes. The electronic component further includes expansion relaxation portions disposed in the inside of the resin insulating layers and located in the vicinity of connection regions of the internal electrodes and the external electrodes. The expansion relaxation portions are formed by using a magnetic powder resin in which a ferrite powder and a resin material are mixed.

14 Claims, 12 Drawing Sheets

ELECTRONIC COMPONENT

Matter enclosed in heavy brackets [ ] appears in the original patent but forms no part of this reissue specification; matter printed in italics indicates the additions made by reissue.

CROSS REFERENCE TO RELATED APPLICATIONS

*The present application is a reissue application under 35 U.S.C. §251 of U.S. patent application Ser. No. 12/551,031, filed Aug. 31, 2009, now U.S. Pat. No. 7,911,311, issued Mar. 22, 2011.*

The present application claims priority to Japanese Patent Application No. 2008-223408, filed Sep. 1, 2008, the entire contents of each of the application being incorporated herein by reference in its entirety.

BACKGROUND OF THE INVENTION

1. Field of the Invention

The present invention relates to an electronic component including a laminate formed from a plurality of resin insulating layers, wherein internal electrodes are connected to external electrodes on end surfaces of the laminate.

2. Description of the Related Art

In general, an electronic component in which a laminate is formed by laminating, for example, resin insulating layers and a coil pattern and, in addition, the laminate is held between two magnetic substrates has been disclosed in the related art, for example, Japanese Unexamined Patent Application Publication No. 8-203737. In this case, internal electrodes connected to the coil pattern are exposed at end surfaces of the laminate. Furthermore, external electrodes are disposed on the end surfaces of the laminate by a sputtering method or the like and the external electrodes are connected to the exposed internal electrodes.

On the other hand, a configuration in which a conductor pad is disposed on an end surface of a laminate in such a way as to locate between an internal electrode and an external electrode is disclosed in the related art, for example, Japanese Unexamined Patent Application Publication No. 2006-287063. In this case, the conductor pad is formed by using the same material as that for the internal electrode and, in addition, has a predetermined area larger than the end surface area of the internal electrode and smaller than the end surface area of the external electrode. Consequently, the conductor pad is configured to enhance the electrical connectivity between the internal electrode and the external electrode.

Incidentally, the linear expansion coefficient of a resin insulating layer is larger than the linear expansion coefficients of magnetic substrates (ceramic substrates), which are formed from ceramic materials, e.g., ferrite, internal electrodes, and the like. Consequently, in the case where a temperature change of an electronic component occurs, for example, in the case where heating is conducted for mounting the electronic component, the resin insulating layer expands and shrinks significantly as compared with the magnetic substrate and the internal electrode. As a result, there is a problem in that the internal electrode and the external electrode are peeled off thereby easily causing a poor connection.

In particular, regarding the external electrode, in order to enhance the adhesion to a magnetic substrate, nickel (Ni), a nickel-chromium alloy (NiCr), chromium (Cr), and the like are used as the materials for a substrate layer. However, the linear expansion coefficients of these materials for the substrate are small as compared with that of the resin and, therefore, poor connection between the internal electrode and the external electrode tends to occur easily along with temperature changes.

Furthermore, in the case where a coil component is formed as the electronic component, as described in the above-mentioned Japanese Unexamined Patent Application Publication No. 8-203737, it is necessary that the distance between the two magnetic substrates is minimized in order to obtain good electric characteristics, e.g., an improvement of inductance. Consequently, each of the thickness dimensions of the resin insulating layer, the coil pattern (e.g., electrode pattern), and the internal electrode is made small. As a result, the thickness dimension of the exposed end surface of the internal electrode is on the order of several micrometers and, therefore, is very small such that the internal electrode and the external electrode tend to peel off easily.

On the other hand, the above-mentioned Japanese Unexamined Patent Application Publication No. 2006-287063 discloses a configuration in which the connectivity between the internal electrode and the external electrode is enhanced by disposing a conductor pad on the end surface of the laminate. However, along with progression of miniaturization and a reduction in profile of the electronic component, the end surface area of the internal electrode and the end surface area of the external electrode have become very small. Consequently, it is difficult to form a conductor pad having a predetermined area accurately. Furthermore, it is necessary to add a new step in order to form the pad and, therefore, there is a problem in that the productivity is reduced.

SUMMARY OF THE INVENTION

The present invention has been made in consideration of the above-described problems in the related art. Accordingly, it is an object of the present invention to provide an electronic component in which the connectivity between an internal electrode and an external electrode is enhanced.

In order to solve the above-described problems, an electronic component according to a first aspect of preferred embodiments of the present invention includes a ceramic substrate, a laminate, which is disposed on a surface of the ceramic substrate, and in which an internal circuit formed from an electrode pattern is disposed in the inside of a plurality of resin insulating layers laminated. The electronic component further includes internal electrodes electrically connected to the above-described internal circuit and exposed at end surfaces of the laminate, and external electrodes disposed on the end surfaces of the above-described laminate and electrically connected to the internal electrodes, wherein the resin insulating layers are provided with expansion relaxation portions. The expansion relaxation portions are located in the vicinity of the region where the internal electrodes and the external electrodes are connected to each other, and which relax the expansion on the end surface side.

According to a second aspect of preferred embodiments of the present invention, the above-described expansion relaxation portions are configured to at least overlap the above-described external electrodes when the laminate is viewed from the above-described external electrodes.

According to a third aspect of preferred embodiments of the present invention, the above-described expansion relaxation portion is formed by using a mixed member in which a ceramic powder constituting the above-described ceramic substrate and a resin material constituting the above-described resin insulating layer are mixed.

According to a fourth aspect of preferred embodiments of the present invention, the above-described internal electrode is provided with an exposed end surface portion which is exposed at the end surface of the above-described laminate, and the above-described expansion relaxation portion is configured to extend in the length direction of the exposed end surface portion to overlap a region constituting about 70% or more of the exposed end surface portion.

According to a fifth aspect of preferred embodiments of the present invention, the above-described ceramic substrate is formed from a magnetic substrate composed of a magnetic material, the above-described internal circuit is formed from a coil circuit composed of a substantially spiral coil pattern serving as the above-described electrode pattern, and the above-described expansion relaxation portion is formed from a magnetic powder resin which serves as the above-described mixed member and in which a magnetic powder is mixed into a resin material.

According to a sixth aspect of preferred embodiments of the present invention, the above-described ceramic substrate is formed from a magnetic substrate composed of a magnetic material, the above-described internal circuit is formed from a common mode choke coil circuit in which two substantially spiral coil patterns serving as the above-described electrode patterns are disposed while being opposed to each other in the thickness direction, and the above-described expansion relaxation portion is formed by using a magnetic powder resin which serves as the above-described mixed member and in which a magnetic powder is mixed into a resin material.

According to a seventh aspect of preferred embodiments of the present invention, the above-described resin insulating layers are provided with the above-described expansion relaxation portions located on the outer perimeter side of the coil pattern, and a core portion, located on the center side of the above-described coil pattern and formed from the above-described magnetic powder resin.

According to the first aspect of preferred embodiments of the present invention, the resin insulating layers are provided with the expansion relaxation portions located in the vicinity of the regions where the internal electrodes and the external electrodes are connected to each other. Therefore, expansion of the resin insulating layers can be relaxed by the expansion relaxation portions and thermal expansion and shrinkage of the laminate can be prevented. Consequently, peeling of the internal electrodes and the external electrodes due to thermal expansion of the resin insulating layers can be prevented and, thereby, the connectivity between the internal electrodes and the external electrodes can be enhanced.

According to the second aspect of preferred embodiments of the present invention, the expansion relaxation portions are configured to at least overlap the external electrodes when the laminate is viewed from the external electrodes. Therefore, transmission of the force due to thermal expansion of the resin insulating layers to the external electrodes can be prevented by using the parts, which overlap the external electrodes, of the expansion relaxation portions.

According to the third aspect of preferred embodiments of the present invention, the expansion relaxation portion is formed from the mixed member in which the ceramic powder constituting the ceramic substrate and the resin material constituting the resin insulating layer are mixed. Therefore, the linear expansion coefficient of the expansion relaxation portion can be specified to be a value between those of the ceramic substrate and the resin insulating layer and, thereby, thermal expansion and shrinkage of the resin insulating layers can be prevented, and deformation of the end surfaces due to heat can be suppressed by the expansion relaxation portions.

According to the fourth aspect of preferred embodiments of the present invention, the expansion relaxation portion is configured to extend in the length direction of the exposed end surface portion to overlap a region constituting about 70% or more of the exposed end surface portion of the internal electrode. Therefore, an effect of preventing peeling between the internal electrodes and the external electrodes can be enhanced and, thereby, the reliability can be improved.

According to the fifth aspect of preferred embodiments of the present invention, the ceramic substrate is formed from the magnetic substrate and the internal circuit is formed from the coil circuit composed of the substantially spiral coil pattern. Therefore, a coil component composed of a coil pattern can be formed as an electronic component. Furthermore, since the expansion relaxation portion is formed by using a magnetic powder resin, which serves as the mixed member and in which a magnetic powder is mixed into a resin material, the connectivity between the internal electrodes and the external electrodes can be enhanced by the expansion relaxation portions.

According to the sixth aspect of preferred embodiments of the present invention, the ceramic substrate is formed from the magnetic substrate and the internal circuit is formed from the common mode choke coil circuit composed of two substantially spiral coil patterns. Therefore, a common mode choke coil component composed of two coil patterns can be disposed as an electronic component. Furthermore, since the expansion relaxation portion is formed from the magnetic powder resin, which serves as the mixed member and in which the magnetic powder is mixed into the resin material, the connectivity between the internal electrodes and the external electrodes can be enhanced by the expansion relaxation portions.

According to the seventh aspect of preferred embodiments of the present invention, the resin insulating layers are provided with the expansion relaxation portions located on the outer perimeter side of the coil pattern and formed from the magnetic powder resin. The resin insulating layers are also provided with the core portion located on the center side of the coil pattern and formed from the magnetic powder resin. Consequently, magnetic paths can be formed by using the expansion relaxation portions and the core portion and, therefore, the acquiring efficiency of inductance or impedance of the coil pattern can be enhanced.

Other features, elements, characteristics and advantages of the present invention will become more apparent from the following detailed description of preferred embodiments of the present invention with reference to the attached drawings.

DESCRIPTION OF THE PREFERRED EMBODIMENTS

Figure 1:
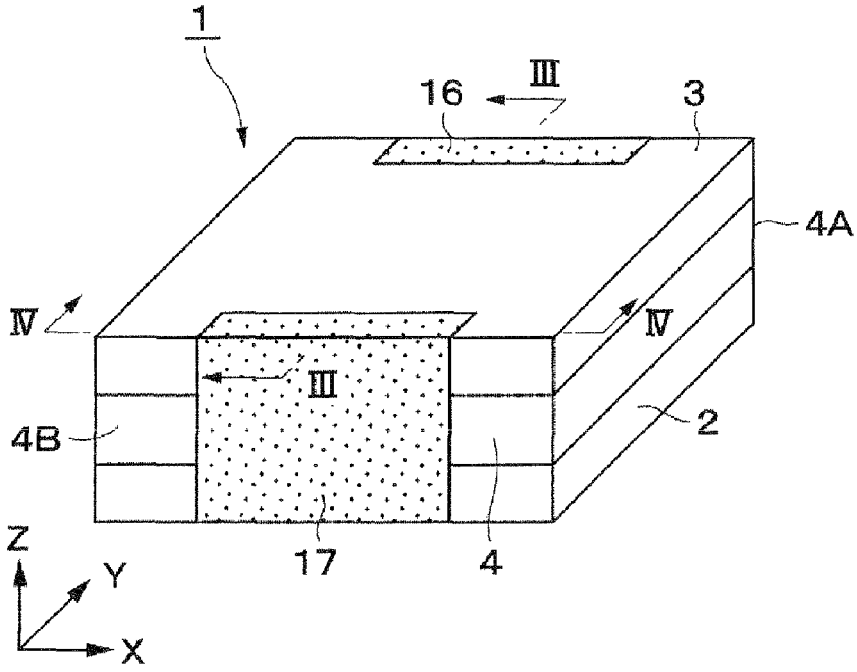
FIG. 1 is a perspective view showing a coil component according to a first embodiment.

Electronic components according to preferred embodiments of the present invention will be described below in detail with reference to the attached drawings.

As summarized above, FIG. 1 to FIG. 5 show a first embodiment according to the present invention. A coil component 1 serving as an electronic component includes first and second magnetic substrates 2 and 3 serving as ceramic substrates and a laminate 4 sandwiched between the magnetic substrates 2 and 3. The magnetic substrates 2 and 3 are substantially formed into the shape of, for example, a quadrangle extending along an X-Y plane. In addition. The magnetic substrates 2 and 3 are formed by using a magnetic material, e.g., ferrite, serving as a ceramic material. In particular, in the case where ferrite is used for the magnetic substrates 2 and 3, the coil component 1 has a high inductance and excellent high-frequency characteristics.

The laminate 4 is formed by laminating resin insulating layers 5 and 10, a coil 9, and the like, which will be described later, in a thickness direction (i.e., Z direction).

A first resin insulating layer 5 is located on a surface of the magnetic substrate 2 and is formed by using a spin coating method, a screen printing method, or the like. As for the resin insulating layer 5, various insulating resin materials, e.g., polyimide resins, epoxy resins, acrylic resins, cyclic olefin resins, and benzocyclobutene resins, are used as nonmagnetic insulating materials. As for the materials for the resin insulating layer 5, a plurality of materials may be used in combination in accordance with the purpose. Furthermore, the value of the linear expansion coefficient of the resin insulating layer 5 is larger than the linear expansion coefficient of the magnetic substrates 2 and 3.

The coil pattern 6 (e.g., electrode pattern) is disposed on the surface of the first resin insulating layer 5 and constitutes the coil 9 together with a lead pattern 8 and the like, which will be described later. As for the material for the coil pattern 6, for example, metals, e.g., silver (Ag), lead (Pd), copper (Cu), and aluminum (Al), and alloys thereof are adopted as materials having excellent electrical conductivity. It is desirable that combinations of the electrode material for the coil pattern 6 and the like and insulating resin materials for the resin insulating layer 5 and the like are selected in consideration of the workability, adhesion, and the like.

Additionally, it is desirable that, for example, the value of the linear expansion coefficient of the coil pattern 6 is larger than the linear expansion coefficient of the magnetic substrates 2 and 3 and smaller than the linear expansion coefficient of the resin insulating layer 5.

The coil pattern 6 is substantially formed into the shape of a spiral by using a series of photolithographic technology, e.g., application of a resist, exposure, development, and etching, after an electrically conductive material film is formed on the surface of the resin insulating layer 5. In this regard, the electrically conductive material film is formed by using a film formation technology, such as a thin film forming method, e.g., sputtering or vacuum evaporation, or a thick film forming method, e.g., screen printing.

The center position of the substantially spiral coil pattern 6 almost agrees with the center position of, for example, the magnetic substrates 2 and 3. Furthermore, an end portion on the outer perimeter side of the coil pattern 6 is located at an outer edge on one side of the resin insulating layer 5 in the Y direction and serves as an internal electrode 6A. Moreover, the internal electrode 6A is provided with an exposed end surface portion 6B which is exposed at an end surface 4A on one side of the laminate 4 in the Y direction. The exposed end surface portion 6B extends substantially in the shape of a slim streak along the X direction (length direction). On the other hand, an end portion on the inner perimeter side of the coil pattern 6 is electrically connected to a lead pattern 8, which will be described later.

Figure 2:
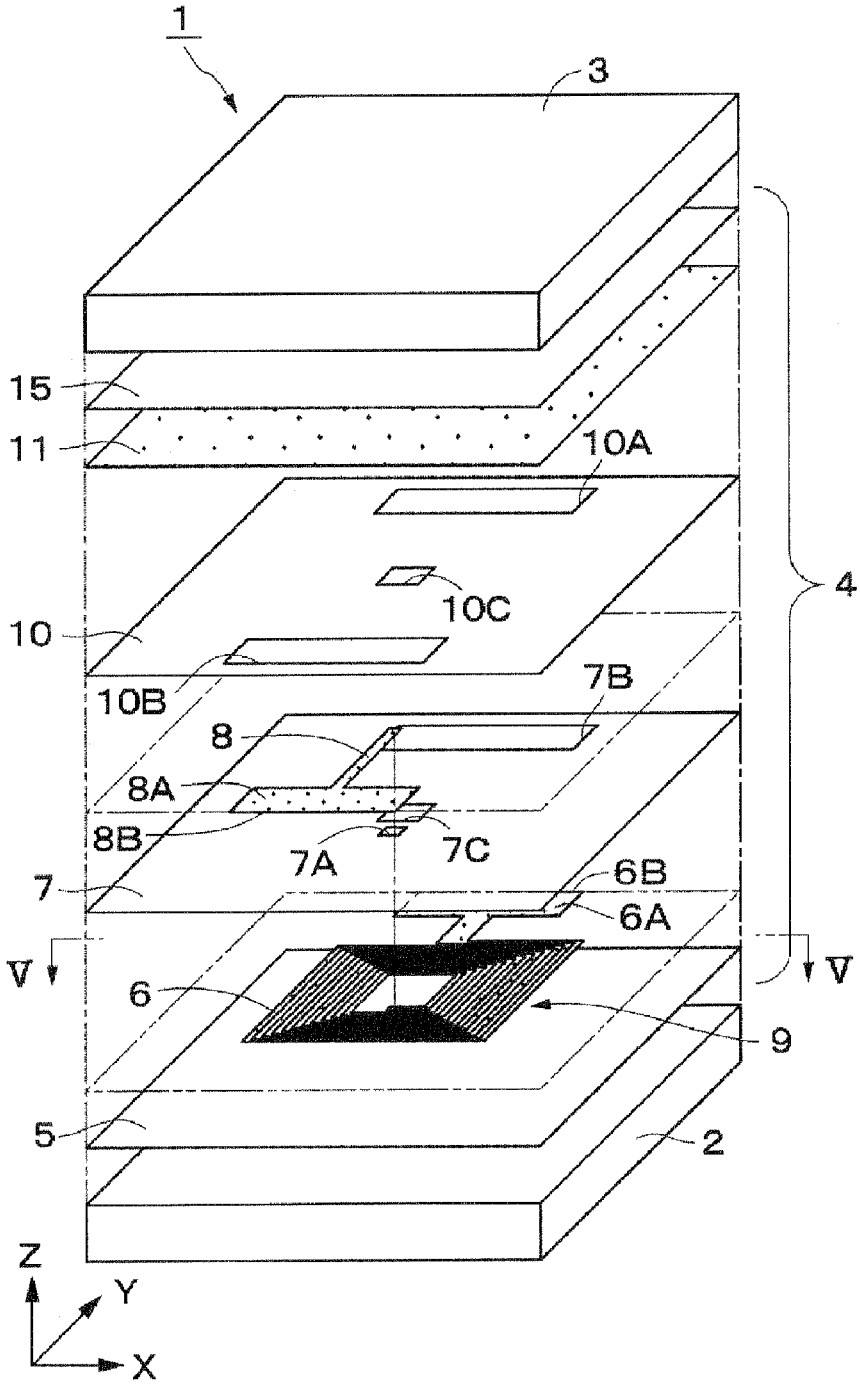
FIG. 2 is an exploded perspective view showing the coil component shown in FIG. 1 in an exploded manner.
Figure 3:
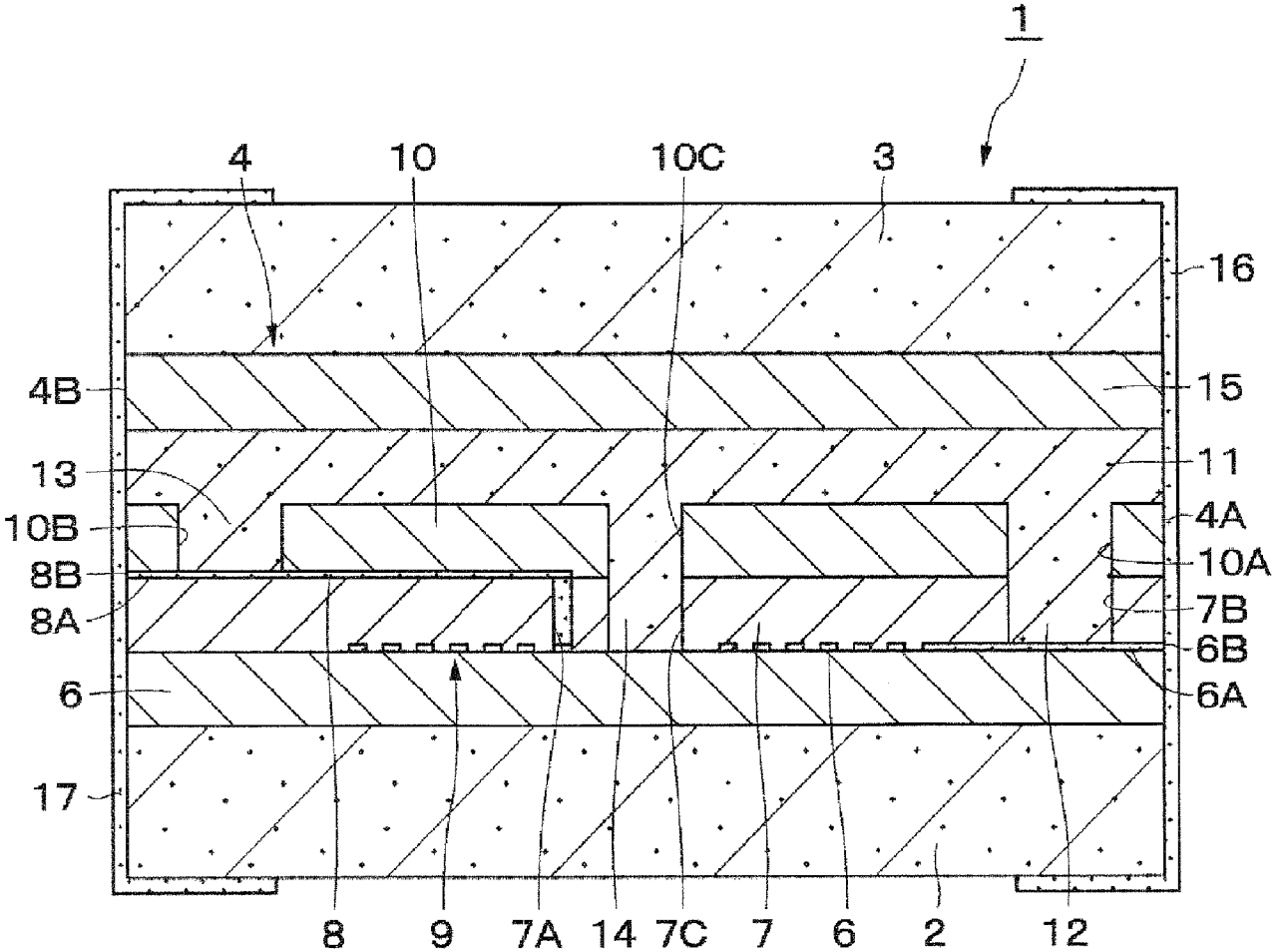
FIG. 3 is a sectional view of the coil component, viewed in the direction indicated by arrows III-III shown in FIG. 1.
Figure 4:
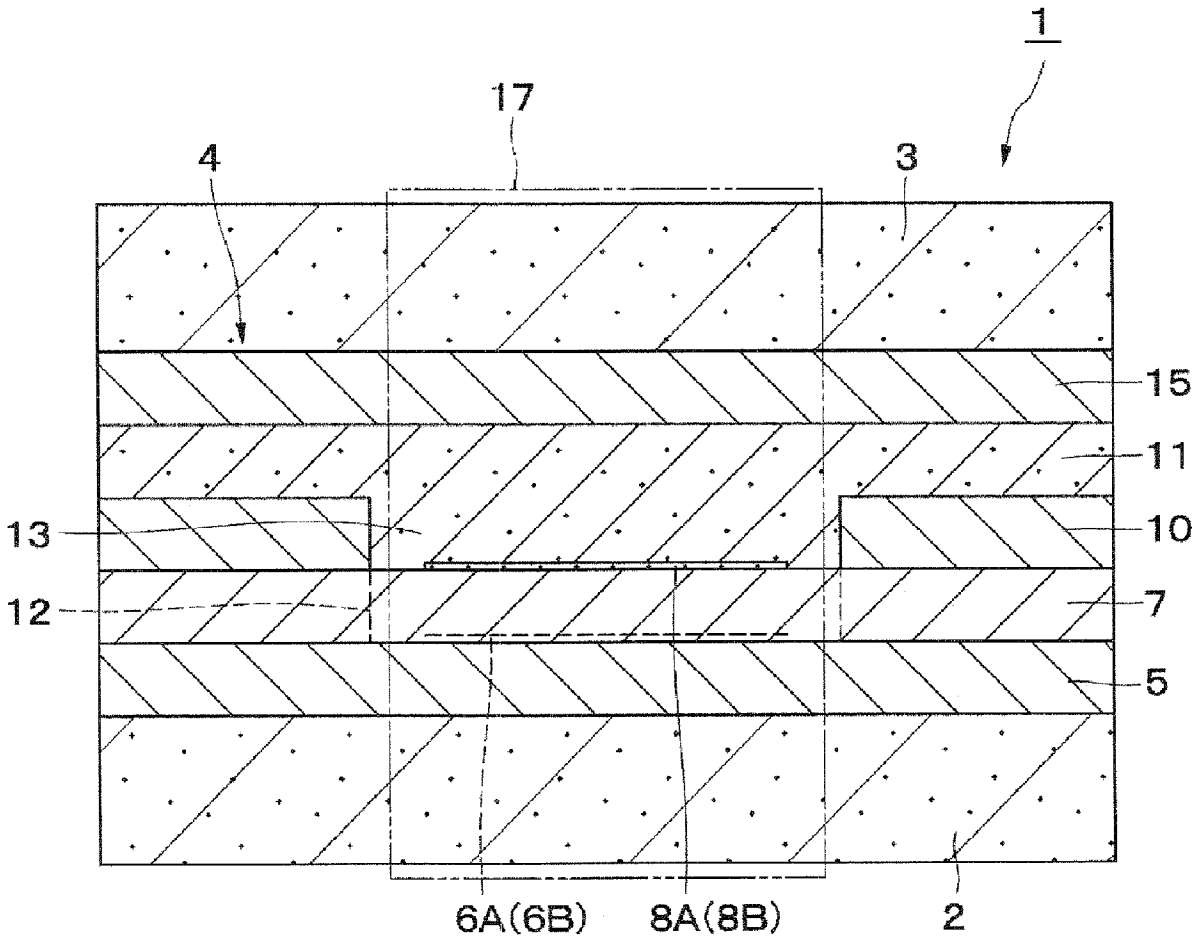
FIG. 4 is a sectional view of the coil component, viewed in the direction indicated by arrows IV-IV shown in FIG. 1.
Figure 5:
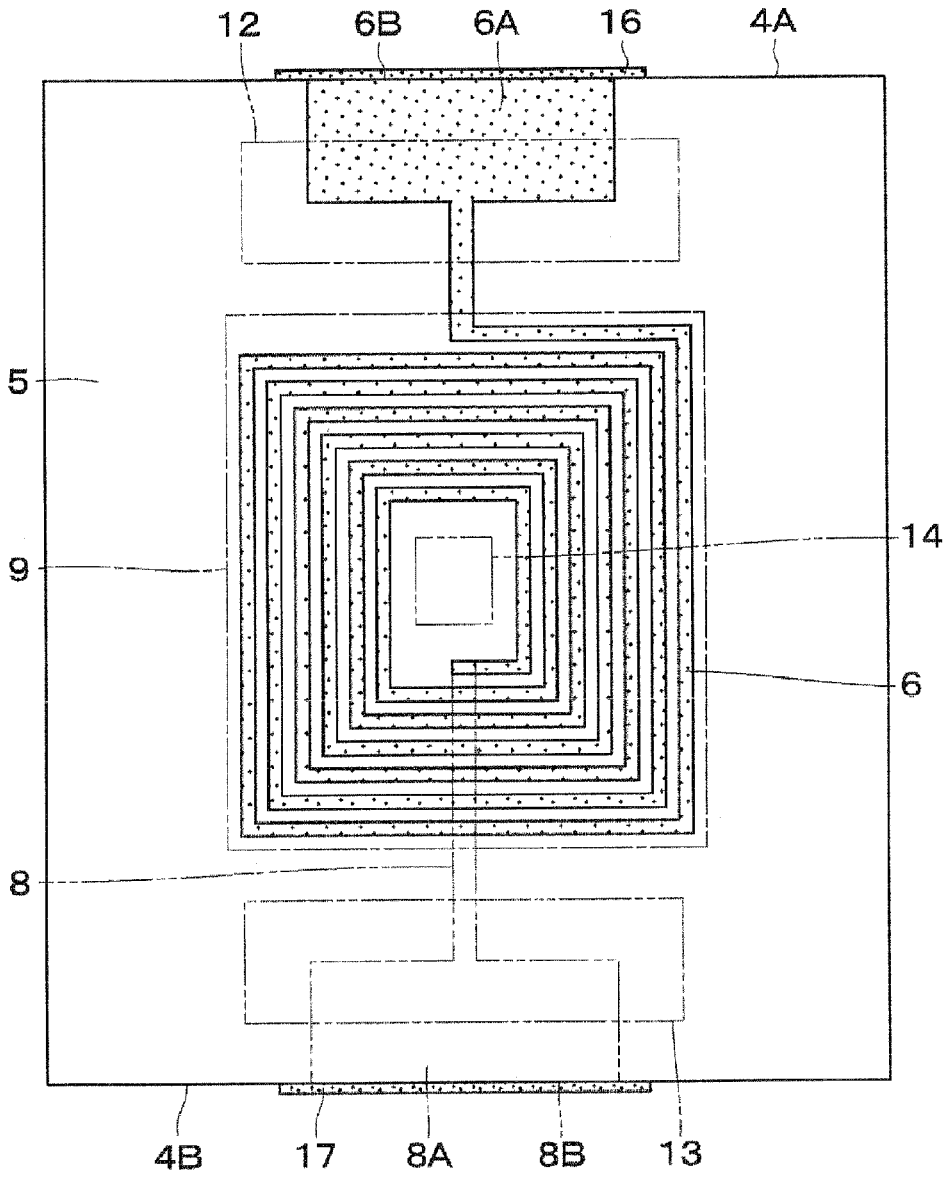
FIG. 5 is a plan view of a coil pattern and the like according to the first embodiment, viewed in the direction indicated by arrows V-V shown in FIG. 2.
Figure 6:
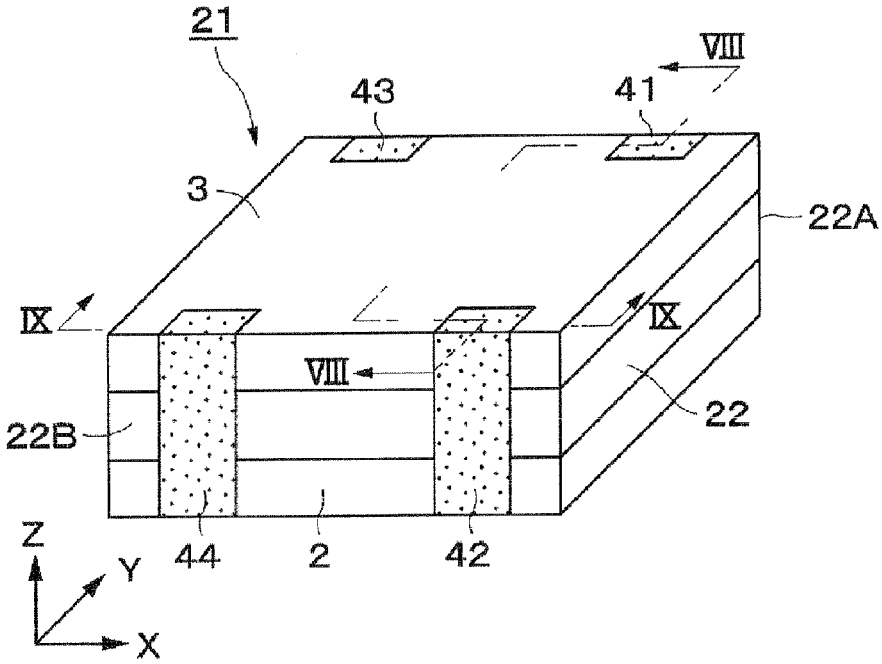
FIG. 6 is a perspective view showing a common mode choke coil component according to a second embodiment.

As shown in FIG. 2 and FIG. 3, an interlayer resin insulating layer 7 is formed on the surface of the coil pattern 6 by using, for example, the same material as that for the resin insulating layer 5. A via hole 7A is formed in the interlayer resin insulating layer 7 by using, for example, a photolithographic technology. The via hole 7A is formed in such a way as to penetrate the interlayer resin insulating layer 7 and is disposed at a location corresponding to, for example, the end portion on the inner perimeter side of the coil pattern 6.

Furthermore, a groove portion 7B is formed in the interlayer resin insulating layer 7 in such a way as to locate in the vicinity of the exposed end surface portion 6B of the coil pattern 6. The groove portion 7B is formed into a slim groove extending in the X direction while being in parallel to the exposed end surface portion 6B. Moreover, a core hole portion 7C is formed in the interlayer resin insulating layer 7 to locate on the center side of the coil pattern 6. The groove portion 7B and the core hole portion 7C are formed together with the via hole 7A to penetrate the interlayer resin insulating layer 7 by using, for example, a photolithographic technology in a manner similar to that of the via hole 7A.

In this regard, in the case where the photolithographic technology is used, a material provided with a photosensitive function is used as the material for the interlayer resin insulating layer 7. In the present embodiment, for example, a photosensitive polyimide resin material is used for the interlayer resin insulating layer 7.

In addition, a lead pattern 8 (e.g., electrode pattern) extending from the inside of the interlayer resin insulating layer 7 toward the outer edge side is formed on the surface of the interlayer resin insulating layer 7. At this time, one end side of the lead pattern 8 is electrically connected to the end portion on the inner perimeter side of the coil pattern 6 through the via hole 7A. On the other hand, the other end side of the lead pattern 8 is located at an outer edge on the other side of the interlayer resin insulating layer 7 in the Y direction and serves as an internal electrode 8A. For example, the internal electrode 8A and the internal electrode 6A are disposed on the opposite sides, that is, in the front direction and the rear direction (i.e., Y direction) shown in FIG. 2, with the coil pattern 6 therebetween.

Furthermore, the internal electrode 8A is provided with an exposed end surface portion 8B which is exposed at an end surface 4B on the other side of the laminate 4 in the Y direction. The exposed end surface portion 8B extends substantially in the shape of a slim streak along the X direction (length direction) in a manner similar to that of the exposed end surface portion 6B.

Consequently, a coil circuit (e.g., coil 9) serving as an internal circuit is formed from the coil pattern 6 and the lead pattern 8.

The second resin insulating layer 10 is located on a surface of the lead pattern 8 and is formed by using, for example, the same material as that for the resin insulating layers 5 and 7. A groove portion 10A having the same shape as that of the groove portion 7B is formed, on one side of the resin insulating layer 10 in the Y direction, at the location corresponding to the groove portion 7B in the interlayer resin insulating layer 7. Therefore, the groove portion 10A is communicated with the groove portion 7B. On the other hand, a groove portion 10B is formed on the other side of the interlayer resin insulating layer 10 in the Y direction in such a way as to locate in the vicinity of the exposed end surface portion 8B of the lead pattern 8.

The groove portion 10B is formed into a slim groove extending in the X direction while being in parallel to the exposed end surface portion 8B. Moreover, a core hole portion 10C having the same shape as that of the core hole portion 7C is formed in the interlayer resin insulating layer 10 at the location corresponding to the core hole portion 7C in the interlayer resin insulating layer 7. Therefore, the core hole portion 10C is communicated with the core hole portion 7C. The groove portions 10A and 10B and the core hole portion 10C are formed together to penetrate the interlayer resin insulating layer 10 by using, for example, a photolithographic technology.

A magnetic layer 11 located on the surface of the second resin insulating layer 10 is formed by using a magnetic powder resin (mixed member) in which, for example, the ferrite powder for forming the magnetic substrates 2 and 3 is mixed into the insulating resin material, such as, for example, a polyimide resin, for forming the resin insulating layers 5, 7, and 10. The magnetic layer 11 contains, for example, about 80 to 90 percent by weight of ferrite powder. Consequently, the value of the linear expansion coefficient of the magnetic layer 11 is smaller than the linear expansion coefficient of the resin insulating layers 5, 7, and 10 and larger than the linear expansion coefficient of the magnetic substrates 2 and 3. The magnetic layer 11 is connected to expansion relaxation portions 12 and 13 and a core portion 14.

The expansion relaxation portions 12 and 13 are disposed in the vicinity of the regions where the internal electrodes 6A and 8A and the external electrodes 16 and 17 are connected to each other. That is, the expansion relaxation portions 12 and 13 are located between the coil 9 serving as the internal circuit and the exposed end surface portions 6B and 8B of the internal electrodes 6A and 8A and are disposed in the inside of the resin insulating layers 7 and 10.

The expansion relaxation portion 12 is located on one side of the laminate 4 in the Y direction and is inserted into the groove portions 7B and 10A of the resin insulating layers 7 and 10. On the other hand, the expansion relaxation portion 13 is located on the other side of the laminate 4 in the Y direction and is inserted into the groove portion 10B of the resin insulating layer 10. Furthermore, the expansion relaxation portions 12 and 13 are formed by using the same magnetic powder resin as that for the magnetic layer 11. Consequently, the value of the linear expansion coefficient of the expansion relaxation portions 12 and 13 is smaller than the linear expansion coefficient of the resin insulating layers 5, 7, and 10 and larger than the linear expansion coefficient of the magnetic substrates 2 and 3. Therefore, even when the resin insulating layers 7 and 10 are thermally expanded, the expansion relaxation portions 12 and 13 suppress the thermal expansion of them so as to relax expansion of the end surface 4A and end surface 4B sides of the laminate 4.

Moreover, the expansion relaxation portion 12 is formed having a dimension in the X direction larger than that of the external electrode 16. Therefore, when the inside of the laminate 4 is viewed through from the external electrode 16, for example, the center side portion in the X direction overlaps the external electrode 16. Likewise, the expansion relaxation portion 13 is formed having a dimension in the X direction larger than that of the external electrode 17 and, therefore, when the inside of the laminate 4 is viewed through from the external electrode 17, for example, the center side portion in the X direction overlaps the external electrode 17.

In addition, the expansion relaxation portions 12 and 13 extend in the length direction (i.e., X direction) of the exposed end surface portions 6B and 8B to overlap the exposed end surface portions 6B and 8B. In order to enhance the connectivity between the internal electrodes 6A and 8A and the external electrodes 16 and 17, it is preferable that the expansion relaxation portions 12 and 13 overlap regions constituting about 70% or more of the exposed end surface portions 6B and 8B, as described later.

The core portion 14 is located at the core hole portions 7C and 10C of the resin insulating layers 7 and 10 and is inserted through the center side of the coil pattern 6. The core portion 14 is formed by using a magnetic powder resin containing the same magnetic material as that for the magnetic layer 11. Consequently, the core portion 14 forms magnetic paths together with the magnetic layer 11 and the expansion relaxation portions 12 and 13 so as to enhance the acquiring efficiency of inductance of the coil 9.

An adhesive resin insulating layer 15 is located between the magnetic layer 11 and the second magnetic substrate 3 and is formed by using, for example, the same material as that for the first resin insulating layer 5. Furthermore, the adhesive resin insulating layer 15 is formed by using, for example, a thermosetting polyimide resin and functions as an adhesive to adhere the second magnetic substrate 3 to the surface of the magnetic layer 11. That is, in production of the coil component 1, initially, the first resin insulating layer 5, the coil 9, the second resin insulating layer 10, and the magnetic layer 11 are laminated on the surface of the first magnetic substrate 2 by repeating a film formation step and the like. After the adhesive resin insulating layer 15 is applied to the back side of the second magnetic substrate 3, the back side of the second magnetic substrate 3 is bonded to the surface of the magnetic layer 11. The bonding of the second magnetic substrate 3 is conducted under a heated and pressurized state in a vacuum or an inert gas, and the pressure is released after cooling.

In this manner, the adhesive resin insulating layer 15 is disposed between the magnetic layer 11 and the second magnetic substrate 3. As a result, the laminate 4 composed of the first and the second resin insulating layers 5 and 10, the coil 9, the magnetic layer 11, and the adhesive resin insulating layer 15 is disposed between the first and the second magnetic substrates 2 and 3.

Incidentally, in order to enhance the acquiring efficiency of inductance of the coil 9, it is preferable that the thickness dimension of the individual resin insulating layers 5, 7, 10, and 15 are specified to be, for example, about 10 μm or less.

The external electrodes 16 and 17 are attached to the end surfaces 4A and 4B, respectively, located on two end sides of the laminate 4 in the Y direction. Furthermore, the external electrode 16 is in contact with the exposed end surface portion 6B and is electrically connected to the internal electrode 6A. On the other hand, the external electrode 17 is in contact with the exposed end surface portion 8B and is electrically connected to the internal electrode 8A.

Moreover, the external electrodes 16 and 17 have a four-layer structure in which, for example, an adhesive layer, first and second solder leach prevention layers, and a soldering layer are laminated in that order from the laminate 4 toward the outside. The adhesive layer is adhered to the laminate 4 and the magnetic substrates 2 and 3 and, in addition, is formed from nichrome (NiCr), titanium (Ti), chromium (Cr), or the like, which is a material excellent in adhesion to the magnetic substrates 2 and 3.

The first solder leach prevention layer is located on the surface of the adhesive layer and is formed from, for example, Monel (NiCu). The second solder leach prevention layer is located on the surface of the first solder leach prevention layer and is formed from, for example, nickel (Ni). Finally, the soldering layer is located on the surface of the second solder leach prevention layer and is formed from, for example, tin (Sn), which is a material having good solderability.

In this regard, the adhesive layer and the first solder leach prevention layer are formed sequentially by a method with good working accuracy, for example, through sputtering while a jig provided with predetermined openings is aligned with the end surfaces 4A and 4B of the laminate 4. On the other hand, the second solder leach prevention layer and the soldering layer are formed sequentially on the surface of the first solder leach prevention layer through, for example, wet plating.

The coil component 1 according to the present embodiment has the above-described configuration. Next, the ratio of overlap extension of the expansion relaxation portions 12 and 13 to the exposed end surface portions 6B and 8B in the X direction and the connection reliability between the internal electrodes 6A and 8A and the external electrodes 16 and 17 were examined. The results thereof are shown in Table 1.

Table 1 shows the results of examination with respect to presence or absence of the expansion relaxation portions 12 and 13 and the rate of occurrence of faulty continuity after formation of four types of coil components having different length dimensions of expansion relaxation portions 12 and 13 in the X direction and standing of the resulting coil components in a high-temperature atmosphere for a predetermined time. In this regard, as for the high-temperature atmosphere employed in the test, the atmospheric temperature was specified to be about 70° C. and the humidity was specified to be about 90%. Furthermore, the standing time of the coil component was two types, about 3,000 hours and about 5,000 hours.

The coil component used in the test was provided with one coil 9 as in the coil component 1 according to the embodiment. The coil pattern 6, the lead pattern 8, and the internal electrodes 6A and 8A were formed by using silver (Ag). The resin insulating layers 5, 7, 10, and 15 were formed by using a polyimide resin. The magnetic layer 11 and the expansion relaxation portions 12 and 13 were formed by using a magnetic powder resin in which a ferrite powder and a polyimide resin were mixed. The external electrodes 16 and 17 were formed having a four-layer structure.

TABLE 1

| Ratio of overlap extension of expansion relaxation portion to exposed end surface portion in the X direction (%) | Rate of occurrence of faulty continuity | |
|---|---|---|
| | After 3000 hours | After 5000 hours |
| 0 | 2 units/30 units | 14 units/30 units |
| 50 | 0/30 units | 2 units/30 units |
| 70 | 0/30 units | 0/30 units |
| 120 | 0/30 units | 0/30 units |

As is clear from the results shown in Table 1, in the case where the expansion relaxation portions 12 and 13 are not disposed (the ratio of length is 0%) as in the related art, in both tests of 3,000 hours and 5,000 hours, regarding a part of coil components of 30 coil components, faulty continuity occurred between the internal electrodes 6A and 8A and the external electrodes 16 and 17. Whereas, in the case where the expansion relaxation portions 12 and 13 were disposed and the ratio of overlap extension of the expansion relaxation portions 12 and 13 to the exposed end surface portions 6B and 8B in the X direction was specified to be about 50%, no faulty continuity occurred in the test of 3,000 hours. In this case, however, faulty continuity occurred between the internal electrodes 6A and 8A and the external electrodes 16 and 17 regarding 2 units of coil components of 30 units of coil components in the test of 5,000 hours.

On the other hand, in the case where the expansion relaxation portions 12 and 13 were disposed and the ratio of overlap extension of the expansion relaxation portions 12 and 13 to the exposed end surface portions 6B and 8B in the X direction was specified to be about 70%, no faulty continuity occurred in both test of 3,000 hours and test of 5,000 hours.

As is clear from these results, in order to enhance the connectivity between the internal electrodes 6A and 6B and the external electrodes 16 and 17, it is preferable that the expansion relaxation portions 12 and 13 overlap regions constituting about 70% or more of the exposed end surface portions 6B and 8B.

As described above, in the present embodiment, the expansion relaxation portions 12 and 13 are disposed in the resin insulating layers 7 and 10 while being located in the vicinity of the exposed end surface portions 6B and 8B, at which the internal electrodes 6A and 8A and the external electrodes 16 and 17 are connected to each other, and therefore, expansion of the resin insulating layers 7 and 10 is relaxed by the expansion relaxation portions 12 and 13 and peeling between the internal electrodes 6A and 8A and the external electrodes 16 and 17 can be prevented.

In particular, in the case where the coil component 1 is formed by sandwiching the both sides of the laminate 4 in the thickness direction (i.e., Z direction) with two magnetic substrates 2 and 3, if the distance between the magnetic substrates 2 and 3 increases, the effect of the magnetic substrates 2 and 3 on the coil 9 decreases, so that desired electric characteristics (e.g., the inductance characteristic and the like) become difficult to obtain. Consequently, there is a limit to the thickness dimensions of the internal electrodes 6A and 8A. In general, the thickness dimensions of the exposed end surface portions 6B and 8B are on the order of several micrometers (total thickness is about 50 μm at the maximum) and, therefore, are very small, so that the connectivity between the internal electrodes 6A and 8A and the external electrodes 16 and 17 tends to deteriorate.

On the other hand, in the present embodiment, the expansion relaxation portions 12 and 13 are disposed between the coil pattern 6 and the exposed end surface portions 6B and 8B. Therefore, even when the resin insulating layers 7 and 10 are thermally expanded and shrunk, thermal expansion and the like in the vicinity of the exposed end surface portions 6B and 8B can be suppressed by the expansion relaxation portions 12 and 13. Consequently, peeling between the internal electrodes 6A and 8A and the external electrodes 16 and 17 due to thermal expansion of the resin insulating layers 7 and 10 can be prevented and the connection durability and the reliability between the internal electrodes 6A and 8A and the external electrodes 16 and 17 can be enhanced.

Furthermore, the expansion relaxation portions 12 and 13 are configured to at least overlap the external electrodes 16 and 17 when the laminate 4 is viewed from the external electrodes 16 and 17. Therefore, transmission of the force due to thermal expansion of the resin insulating layers 7 and 10 to the external electrodes 16 and 17 can be prevented by using the parts, which overlap the external electrodes 16 and 17, of the expansion relaxation portions 12 and 13.

The expansion relaxation portions 12 and 13 are formed by using the magnetic powder resin (i.e., mixed member) in which the ferrite powder (i.e., ceramic powder) constituting the magnetic substrates 2 and 3 and the resin material constituting the resin insulating layers 7 and 10 are mixed. Therefore, the linear expansion coefficient of the expansion relaxation portions 12 and 13 can be specified to be a value between those of the magnetic substrates 2 and 3 and the resin insulating layers 7 and 10. Consequently, thermal expansion and shrinkage of the resin insulating layers 7 and 10 can be prevented and deformation of the end surfaces 4A and 4B of the laminate 4 due to heat can be suppressed by the expansion relaxation portions 12 and 13.

Moreover, the expansion relaxation portions 12 and 13 are configured to extend in the length direction (X direction) of the exposed end surface portions 6B and 8B in such a way as to overlap a region constituting about 70% or more of the exposed end surface portions 6B and 8B of the internal electrodes 6A and 8A. Therefore, an effect of preventing peeling between the internal electrodes 6A and 8A and the external electrodes 16 and 17 can be enhanced and, thereby, the reliability can be improved.

The resin insulating layers 7 and 10 are provided with the expansion relaxation portions 12 and 13, which are located on the outer perimeter side of the coil pattern 6 and which are formed from the magnetic powder resin, and the core portion 14, which is located on the center side of the coil pattern 6 and which is formed from the magnetic powder resin. Consequently, magnetic paths can be formed by using the expansion relaxation portions 12 and 13 and the core portion 14 and, therefore, the acquiring efficiency of inductance or impedance of the coil pattern 6 can be enhanced.

In the first embodiment, the expansion relaxation portion 12 is configured to be inserted into two resin insulating layers 7 and 10 while a part of which is in contact with the surface of the internal electrode 6A. The expansion relaxation portion 13 is configured to be inserted into one resin insulating layer 10 while a part of which is in contact with the surface of the internal electrode 8A. However, the present invention is not limited thereto. For example, the expansion relaxation portions 12 and 13 may be disposed at locations not interfering with the internal electrodes 6A and 8A and, in addition, be inserted into a plurality of resin insulating layers 5, 7, and 10 while penetrating up to the magnetic substrate 2.

Likewise, the core portion 14 may be inserted into a plurality of resin insulating layers 5, 7, and 10 while penetrating up to the magnetic substrate 2. In this case, the magnetic paths by the expansion relaxation portions 12 and 13 and the core portion 14 can be extended to the magnetic substrate 2 and, thereby, the acquiring efficiency of inductance and the like can be further enhanced.

FIG. 6 to FIG. 10 show a second embodiment according to the present invention. The present embodiment is characterized in that two substantially spiral coil patterns serving as the electrode patterns are disposed in the inside of a laminate, while being opposed to each other in the thickness direction to constitute a common mode choke coil circuit serving as an internal circuit.

Incidentally, in the present embodiment, the same constituents as those in the above-described first embodiment are indicated by the same reference numerals as those set forth above and further explanations thereof will not be provided.

A common mode choke coil component 21 includes first and second magnetic substrates 2 and 3 and a laminate 22 sandwiched between the magnetic substrates 2 and 3. The laminate 22 is formed by laminating resin insulating layers 23, 28, and 33, coils 27 and 32, and the like, which will be described later, in a thickness direction.

A first resin insulating layer 23 is located on a surface of the magnetic substrate 2 and is formed by using a spin coating method, a screen printing method, or the like. Here, the resin insulating layer 23 is formed by using a resin material, e.g., a polyimide resin, in a manner similar to that for the resin insulating layer 5 according to the first embodiment.

Furthermore, in the resin insulating layer 23, individual groove portions 23A to 23D are disposed while being located between the internal electrodes 24A, 26A, 29A, and 31A and coils 27 and 32, which will be described later, and penetrating in the thickness direction (i.e., Z direction). At this time, the groove portions 23A to 23D are disposed in the vicinity of exposed end surface portions 24B, 26B, 29B, and 31B, and are extended in the X direction in parallel to the exposed end surface portions 24B, 26B, 29B, and 31B. Moreover, the resin insulating layer 23 is provided with a core hole portion 23E located on the center sides of the coil patterns 24 and 29, which is described later, and which penetrates in the thickness direction.

The coil pattern 24 (e.g., electrode pattern) is disposed on the surface of the first resin insulating layer 23 and constitutes a primary coil 27 together with a lead pattern 26 and the like, which will be described later.

The coil pattern 24 is formed substantially in the same manner as that for the coil pattern 6 according to the first embodiment, and is formed into a substantially spiral shape by using, for example, an electrically conductive metal material.

In this regard, the center position of the substantially spiral coil pattern 24 substantially agrees with the center position of, for example, the magnetic substrates 2 and 3.

Furthermore, an end portion on the outer perimeter side of the coil pattern 24 is located at an outer edge on one side of the resin insulating layer 23 in the Y direction and serves as an internal electrode 24A. In addition, the internal electrode 24A is provided with an exposed end surface portion 24B which is exposed at an end surface 22A on one side of the laminate 22 in the Y direction. At this time, the exposed end surface portion 24B extends substantially in the shape of a slim streak along the X direction (i.e., length direction). On the other hand, an end portion on the inner perimeter side of the coil pattern 24 is electrically connected to a lead pattern 26, which will be described later.

Figure 7:
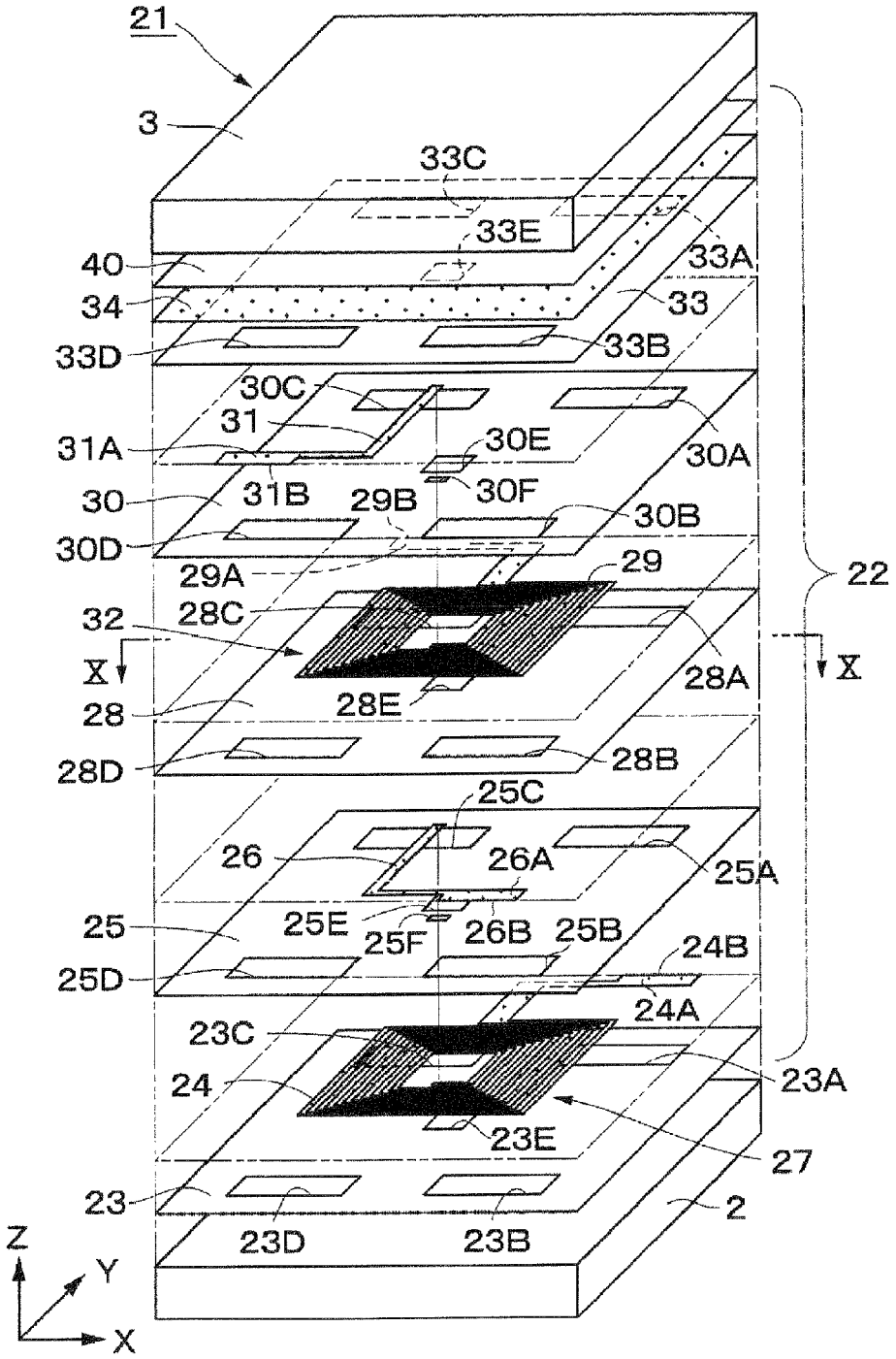
FIG. 7 is an exploded perspective view showing the common mode choke coil component shown in FIG. 6 in an exploded manner.
Figure 8:
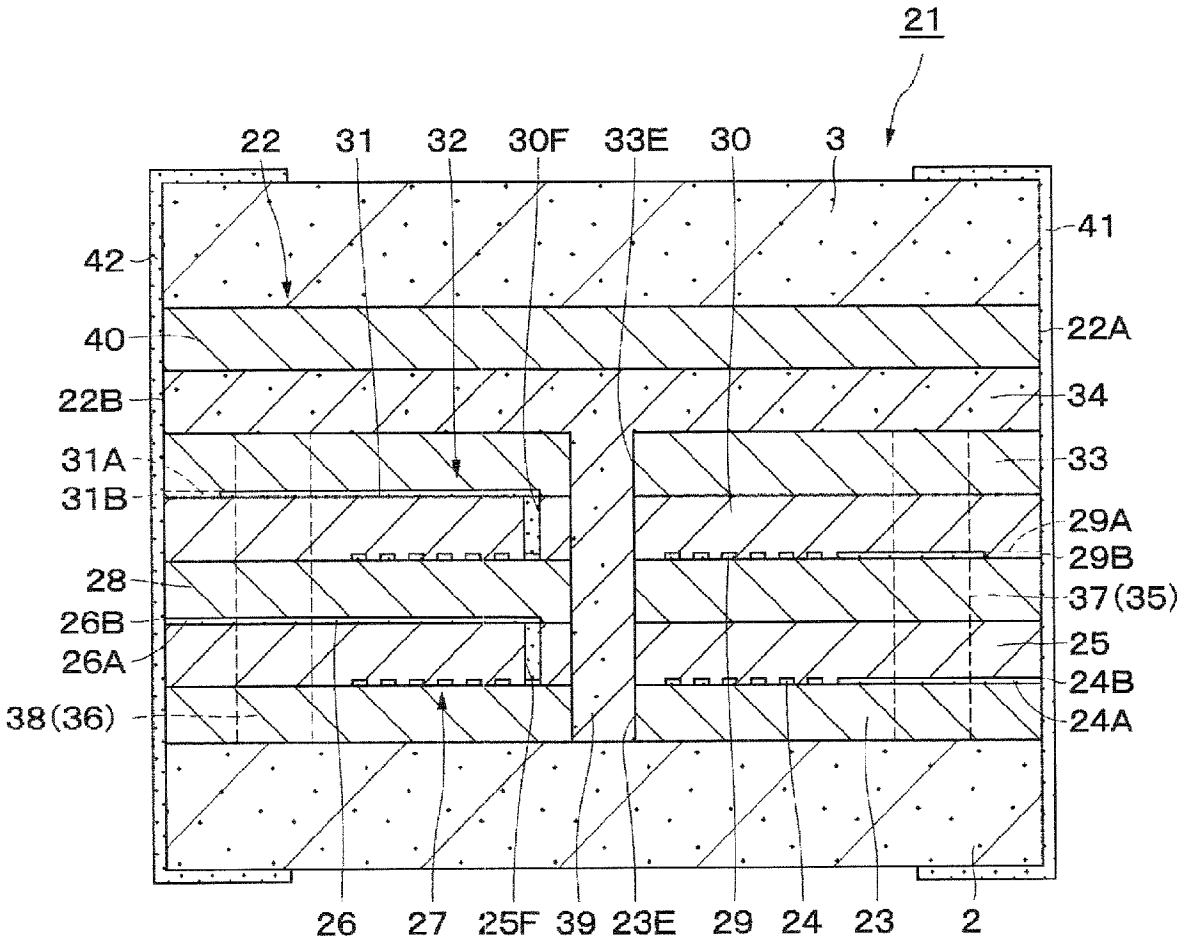
FIG. 8 is a sectional view of the common mode choke coil component, viewed in the direction indicated by arrows VIII-VIII shown in FIG. 6.
Figure 9:
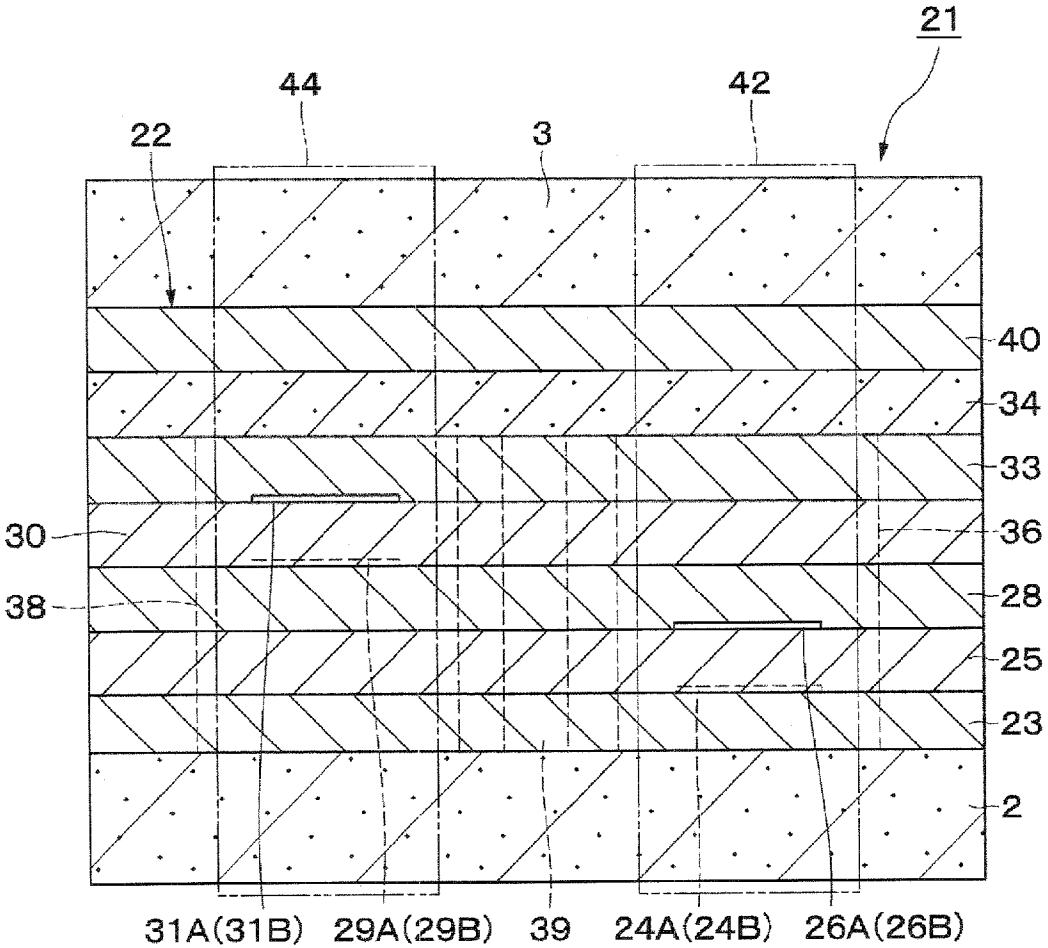
FIG. 9 is a sectional view of the common mode choke coil component, viewed in the direction indicated by arrows IX-IX shown in FIG. 6.
Figure 10:
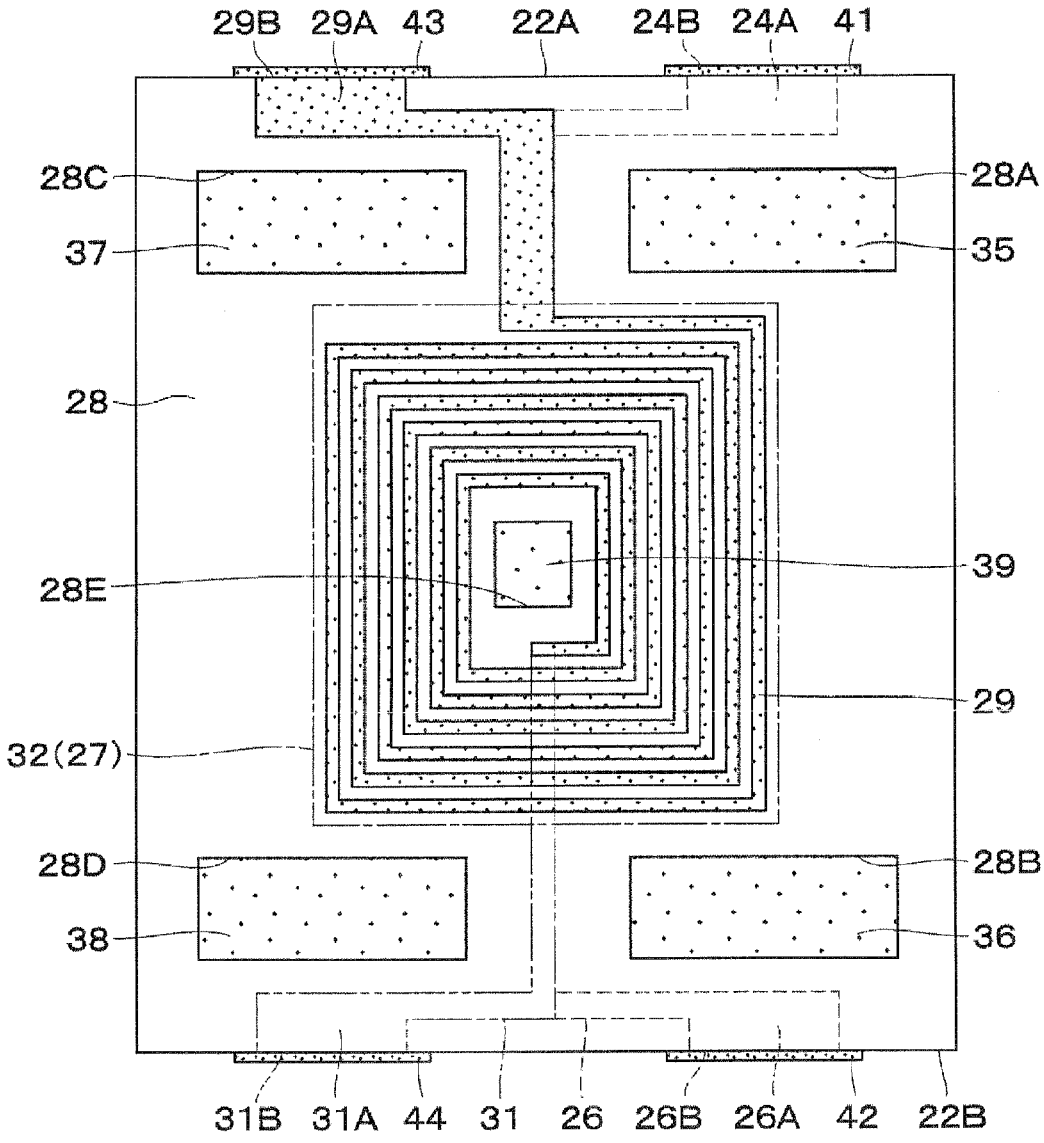
FIG. 10 is a plan view of a coil pattern and the like according to the second embodiment, viewed in the direction indicated by arrows X-X shown in FIG. 7.

As shown in FIG. 7 and FIG. 8, an interlayer resin insulating layer 25 is formed on the surface of the coil pattern 24 by using, for example, the same material as that for the resin insulating layer 23. In the interlayer resin insulating layer 25, groove portions 25A to 25D are disposed at locations opposite to the groove portions 23A to 23D, respectively, and a core hole portion 25E is disposed at the location opposite to the core hole portion 23E. Furthermore, a via hole 25F is disposed in the interlayer resin insulating layer 25 at a location opposite to the end portion on the inner perimeter side of the coil pattern 24. All the groove portions 25A to 25D, the core hole portion 25E, and the via hole 25F are disposed while penetrating the interlayer resin insulating layer 25.

In addition, a lead pattern 26 (e.g., electrode pattern) extending from the inside of the interlayer resin insulating layer 25 toward the outer edge side is disposed on the surface of the interlayer resin insulating layer 25. One end side of the lead pattern 26 is electrically connected to the end portion on the inner perimeter side of the coil pattern 24 through the via hole 25F. On the other hand, the other end side of the lead pattern 26 is located at an outer edge on the other side of the interlayer resin insulating layer 25 in the Y direction and serves as an internal electrode 26A. For example, the internal electrode 26A and the internal electrode 24A are disposed on the opposite sides, that is, in the front and rear directions (i.e., Y direction) shown in FIG. 7, with the coil pattern 24 therebetween.

Furthermore, the internal electrode 26A is provided with an exposed end surface portion 26B which is exposed at an end surface 22B on the other side of the laminate 22 in the Y direction. The exposed end surface portion 26B extends substantially in the shape of a slim streak along the X direction (length direction) in a manner similar to that of the exposed end surface portion 24B.

In this regard, a primary coil 27 is formed from the coil pattern 24 and the lead pattern 26.

An intercoil resin insulating layer 28 is located on a surface of the lead pattern 26 and is formed by using, for example, the same material as the resin insulating layers 23 and 25. The intercoil resin insulating layer 28 insulates the primary coil 27 from a secondary coil 32. As in the resin insulating layer 23, the intercoil resin insulating layer 28 is provided with groove portions 28A to 28D and a core hole portion 28E at the locations opposite to the groove portions 25A to 25D and the core hole portion 25E.

A coil pattern 29, an interlayer resin insulating layer 30, and a lead pattern 31, which are substantially the same as the coil pattern 24, the interlayer resin insulating layer 25, and the lead pattern 26, are formed on the surface of the intercoil resin insulating layer 28 by repeating substantially the same film formation step and the like as those for the primary coil 27.

However, internal electrodes 29A and 31A, with exposed end surface portions 29B and 31B, respectively, of the coil pattern 29 and the lead pattern 31 are disposed at locations different from the locations of the internal electrodes 24A and 26A having exposed end surface portions 24B and 26B, respectively, of the coil pattern 24 and the lead pattern 26, for example, locations away from the internal electrodes 24A and 26A in the left or right direction (i.e., X direction), as shown in FIG. 7.

Furthermore, as in the resin insulating layer 25, the interlayer resin insulating layer 30 is provided with groove portions 30A to 30D, a core hole portion 30E, and a via hole 30F at the locations opposite to the groove portions 25A to 25D, the core hole portion 25E, and the via hole 25F.

Moreover, the coil pattern 29 is connected to the lead pattern 31 through the via hole 30F of the interlayer resin insulating layer 30 so as to constitute the secondary coil 32.

Furthermore, the center position of the coil pattern 29 substantially coincides with the center position of the magnetic substrates 2 and 3, and, in addition, the coil pattern 29 is disposed, while being opposed to the coil pattern 24, with the intercoil resin insulating layer 28 and the like therebetween. Consequently, the primary coil 27 and the secondary coil 32 are magnetically closely bonded to each other while being laminated in the thickness direction, so as to constitute a common mode choke coil circuit serving as an internal circuit.

A second resin insulating layer 33 is located between the secondary coil 32 and the second magnetic substrate 3 and is formed by using, for example, the same material as that for the first resin insulating layer 23. Furthermore, as in the first resin insulating layer 23, the second resin insulating layer 33 is provided with groove portions 33A to 33D and a core hole portion 33E at the locations opposite to the groove portions 23A to 23D and the core hole portion 23E.

A magnetic layer 34 is located on the surface of the second resin insulating layer 33 and is formed substantially in the same manner as that for the magnetic layer 11 according to the first embodiment. Therefore, the magnetic layer 34 is formed by using a magnetic powder resin (mixed member) in which, for example, the ferrite powder for forming the magnetic substrates 2 and 3 is mixed into the insulating resin material, such as, for example, a polyimide resin, for forming the resin insulating layers 23, 25, 28, 30, and 33. Consequently, the value of the linear expansion coefficient of the magnetic layer 34 is smaller than the linear expansion coefficient of the resin insulating layers 23, 25, 28, 30, and 33 and larger than the linear expansion coefficient of the magnetic substrates 2 and 3. The magnetic layer 34 is connected to expansion relaxation portions 35 to 38 and a core portion 39.

The expansion relaxation portions 35 to 38 are disposed in the vicinity of the regions where the internal electrodes 24A, 26A, 29A, and 31A and the external electrodes 41 to 44 are connected to each other. That is, the expansion relaxation portions 35 to 38 are located between the coils 27 and 32 constituting the internal circuits and the exposed end surface portions 24B, 26B, 29B, and 31B of the internal electrodes 24A, 26A, 29A, and 31A and are disposed in the inside of the resin insulating layers 23, 25, 28, 30, and 33.

The expansion relaxation portion 35 is located on one side of the laminate 22 in the Y direction and is inserted into the groove portions 23A, 25A, 28A, 30A, and 33A of the resin insulating layers 23, 25, 28, 30, and 33.

The expansion relaxation portion 36 is located on the other side of the laminate 22 in the Y direction and is inserted into the groove portions 23B, 25B, 28B, 30B, and 33B of the resin insulating layers 23, 25, 28, 30, and 33.

The expansion relaxation portion 37 is located on the one side of the laminate 22 in the Y direction and is inserted into the groove portions 23C, 25C, 28C, 30C, and 33C of the resin insulating layers 23, 25, 28, 30, and 33.

The expansion relaxation portion 38 is located on the other side of the laminate 22 in the Y direction and is inserted into the groove portions 23D, 25D, 28D, 30D, and 33D of the resin insulating layers 23, 25, 28, 30, and 33.

Furthermore, the expansion relaxation portions 35 to 38 are formed by using the same magnetic powder resin as that for the magnetic layer 34. Consequently, the value of the linear expansion coefficient of the expansion relaxation portions 35 to 38 is smaller than the linear expansion coefficient of the resin insulating layers 23, 25, 28, 30, and 33 and larger than the linear expansion coefficient of the magnetic substrates 2 and 3. Therefore, even when the resin insulating layers 23, 25, 28, 30, and 33 are thermally expanded, the expansion relaxation portions 35 to 38 suppress the thermal expansion of them so as to relax expansion of the end surface 22A and end surface 22B sides of the laminate 22.

Moreover, the expansion relaxation portion 35 is formed having a dimension in the X direction larger than that of the external electrode 41. Therefore, when the inside of the laminate 22 is viewed through from the external electrode 41, for example, the center side portion in the X direction overlaps the external electrode 41. Likewise, the expansion relaxation portions 36 to 38 are formed having a dimension in the X direction larger than that of the external electrodes 42 to 44 and, therefore, when the inside of the laminate 22 is viewed through from the external electrodes 42 to 44, for example, the center side portion in the X direction overlaps the external electrodes 42 to 44.

In addition, the expansion relaxation portions 35 to 38 extend in the length direction (i.e., X direction) of the exposed end surface portions 24B, 26B, 29B, and 31B in such a way as to overlap the exposed end surface portions 24B, 26B, 29B, and 31B. In this regard, it is preferable that the expansion relaxation portions 35 to 38 overlap regions constituting about 70% or more of the exposed end surface portions 24B, 26B, 29B, and 31B.

The core portion 39 is located at the core hole portions 23E, 25E, 28E, 30E, and 33E of the resin insulating layers 23, 25, 28, 30, and 33 and is inserted through the center side of the coil patterns 24 and 29. The core portion 39 is formed by using a magnetic powder resin containing the same magnetic material as that for the magnetic layer 34. Consequently, the core portion 39 forms magnetic paths together with the magnetic layer 34 and the expansion relaxation portions 35 to 38 so as to enhance the acquiring efficiency of inductance of the coils 27 and 32.

An adhesive resin insulating layer 40 is located between the magnetic layer 34 and the second magnetic substrate 3 and is formed by using, for example, the same material as that for the first resin insulating layer 23. Furthermore, the adhesive resin insulating layer 40 is formed by using, for example, a thermosetting polyimide resin and functions as an adhesive to adhere the second magnetic substrate 3 to the surface of the magnetic layer 34.

Consequently, the laminate 22 composed of the first and the second resin insulating layers 23 and 33, the coils 27 and 32, the magnetic layer 34, and the adhesive resin insulating layer 40 is formed between the first and the second magnetic substrates 2 and 3.

The individual external electrodes 41 to 44 are attached to the end surfaces 22A and 22B located on two end sides of the laminate 22 in the Y direction. Furthermore, the external electrode 41 is in contact with the exposed end surface portion 24B and is electrically connected to the internal electrode 24A. The external electrode 42 is in contact with the exposed end surface portion 26B and is electrically connected to the internal electrode 26A. On the other hand, the external electrode 43 is in contact with the exposed end surface portion 29B and is electrically connected to the internal electrode 29A. The external electrode 44 is in contact with the exposed end surface portion 31B and is electrically connected to the internal electrode 31A.

Moreover, the external electrodes 41 to 44 have a four-layer structure in which, for example, an adhesive layer, first and second solder leach prevention layers, and a soldering layer are laminated in that order from the laminate 22 toward the outside, as in the external electrodes 16 and 17 according to the first embodiment.

Regarding the present embodiment having the above-described configuration, substantially the same effects as those in the first embodiment can be obtained. In particular, in the present embodiment, the expansion relaxation portions 35 to 38 and the core portion 39 are formed by using the magnetic powder resin and, in addition, are allowed to penetrate the resin insulating layers 23, 25, 28, 30, and 33 so as to come into contact with the magnetic substrate 2. Consequently, the effect of formation of the magnetic paths by the expansion relaxation portions 35 to 38 and the core portion 39 can be enhanced and the acquiring efficiency of inductance or impedance can be further enhanced.

In the configurations of the above-described individual embodiments, the magnetic substrates 2 and 3 are disposed on both end sides of the laminates 4 and 22 in the thickness direction. However, for example, the magnetic substrate 2 may be omitted.

Furthermore, in the above-described first embodiment, the coil circuit is formed as the internal circuit and in the above-described second embodiment, the common mode choke coil circuit is formed as the internal circuit. However, the present invention is not limited to this. For example, a resonant circuit in which a coil and a capacitor are combined may be formed.

In the configurations of the above-described individual embodiments, when the insides of the laminates 4 and 22 are viewed through from the external electrodes 16, 17, and 41 to 44, a part of the expansion relaxation portions 12, 13, and 35 to 38 overlap the external electrodes 16, 17, and 41 to 44. However, the entire expansion relaxation portions may overlap the external electrodes.

In the configurations of the above-described individual embodiments, the magnetic substrates 2 and 3 are used as the ceramic substrates. However, the material is not limited to the magnetic material and other ceramic materials may be used.

Figure 11:
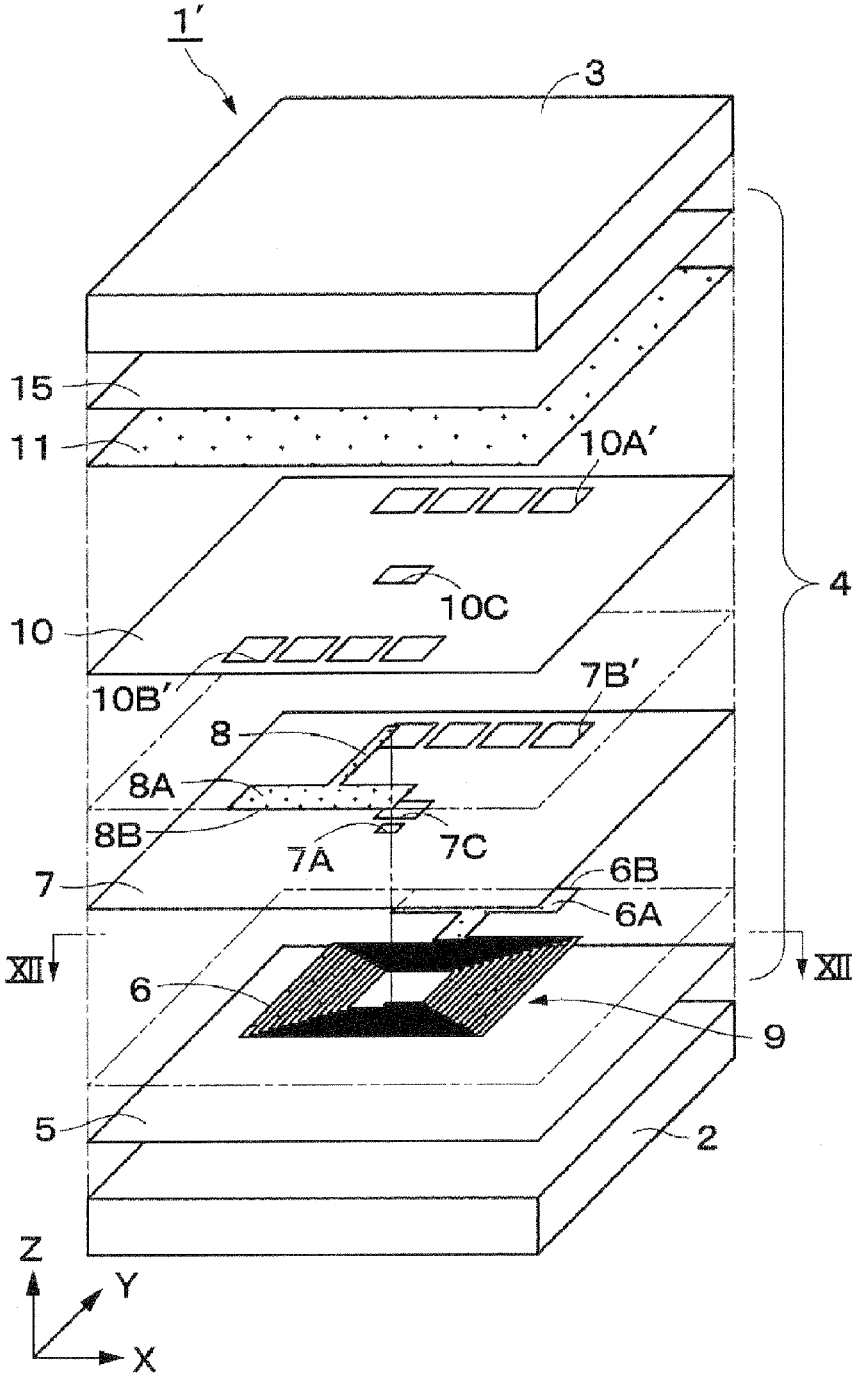
FIG. 11 is an exploded perspective view showing the coil component according to a modified example in an exploded manner.
Figure 12:
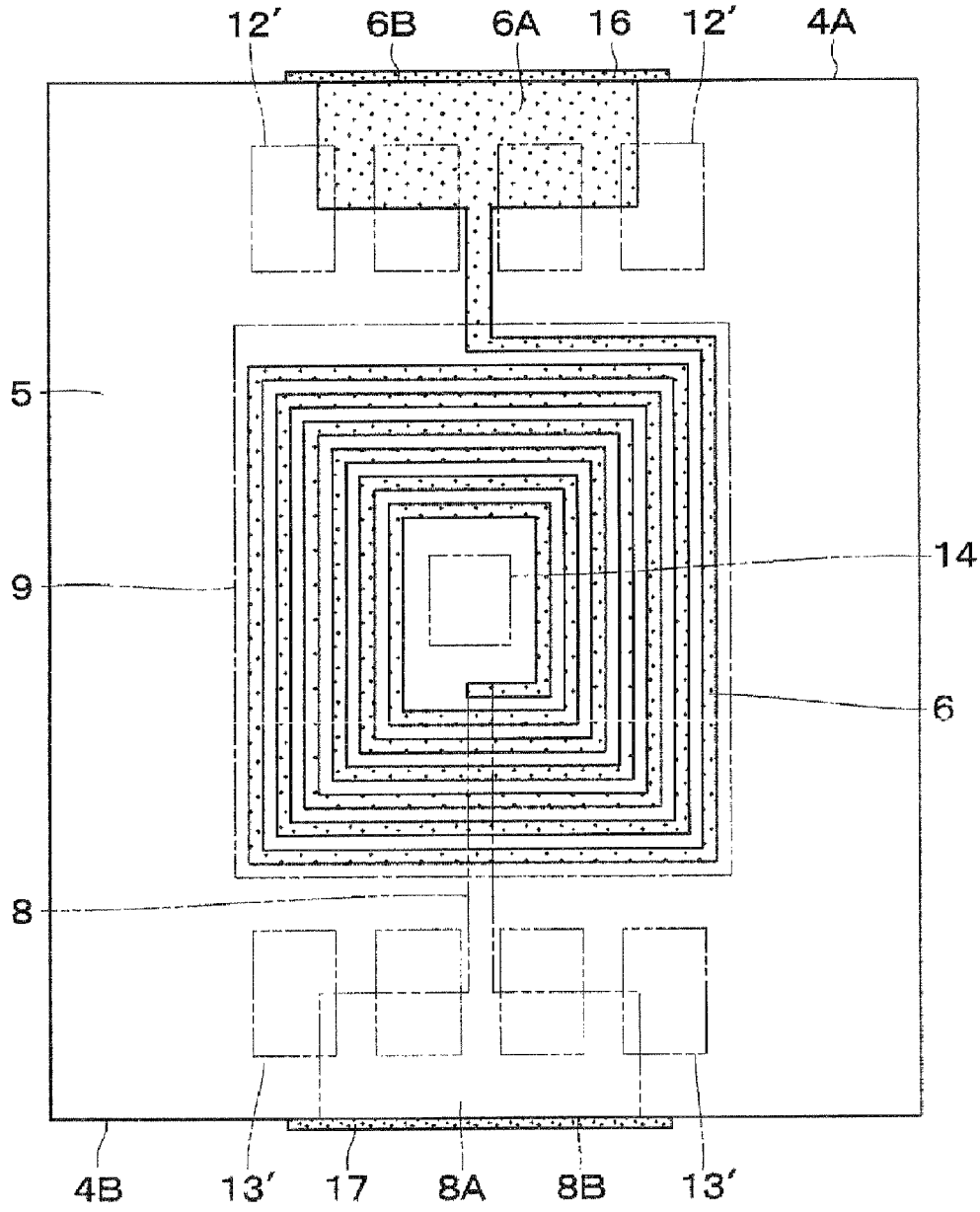
FIG. 12 is a plan view of a coil pattern and the like according to the modified example, viewed in the direction indicated by arrows XII-XII shown in FIG. 11.

In the configurations of the above-described individual embodiments, the expansion relaxation portions 12, 13, and 35 to 38 extend in the X direction along the exposed end surface portions 6B, 8B, 24B, 26B, 29B, and 31B. However, the present invention is not limited to thereto. For example, as indicated by a coil component 1' shown in FIG. 11 and FIG. 12 according to a modified example, a plurality of expansion relaxation portions 12' and 13' aligned in the X direction may be disposed. In this case, the opening areas of individual groove portions 7B', 10A', and 10B' formed in the resin insulating layers 7 and 10 become small. Therefore, for example, in the case where the resin insulating layer 10 is formed by using the spin coating method, diffusion of the resin material is not hindered by the groove portion 7B'. Consequently, a uniform film can be formed.

In the configurations of the above-described individual embodiments, the expansion relaxation portions 12, 13, and 35 to 38 are formed by using the magnetic powder resin. However, materials having the linear expansion coefficients smaller than the linear expansion coefficient of the resin insulating layer and larger than the linear expansion coefficient of the ceramic substrate may be employed. Mixed materials in which the resin material and other ceramic materials are mixed may be used.

Moreover, the material for the expansion relaxation portion is not limited to the mixed materials. The expansion relaxation portion may be formed from, for example a gap. In this case, when the resin insulating layer is thermally expanded, deformation of the resin insulating layer due to thermal expansion can be absorbed by the expansion relaxation portion. Consequently, deformation of the end surface of the laminate can be suppressed.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. An electronic component comprising:

a ceramic substrate;

a laminate which is disposed on a surface of the ceramic substrate and in which an internal circuit formed from an electrode pattern is disposed in the inside of a plurality of laminated resin insulating layers;

internal electrodes electrically connected to the internal circuit and exposed at an end surfaces of the laminate; and external electrodes disposed on the end surfaces of the laminate and electrically connected to the internal electrodes, wherein [the resin insulating layers are provided with expansion relaxation portions located in the vicinity where the internal electrodes and the external electrodes are connected to each other, the expansion relaxation portions being adapted to relax the expansion on the end surface sides] *the internal electrodes are provided with exposed end surface portions which are exposed at the end surfaces of the laminate and are connected to the external electrodes,*

*the resin insulating layers are provided with expansion relaxation portions located between the internal circuit and the exposed end surface portions, inside the outer edges of the resin insulating layers, the expansion relaxation portions being adapted to relax the expansion on the end surface sides, and*

*the expansion relaxation portions are configured to at least overlap the external electrodes when the laminate is viewed from the external electrode and comprise a mixed member in which a ceramic powder constituting the ceramic substrate and a resin material constituting the resin insulating layer are mixed.*

2. The electronic component according to claim 1, wherein [the expansion relaxation portions are configured to at least overlap the external electrodes when the laminate is viewed from the external electrode] *the resin insulating layers are provided with groove portions which penetrate in the thickness direction and are located between the internal circuit and the exposed end surface portions, inside the outer edges of the resin insulating layers, and*

*the expansion relaxation portions are configured to be inserted into the groove portions.*

3. The electronic component according to claim 2, wherein the ceramic substrate is formed from a magnetic substrate comprising a magnetic material, the internal circuit is formed from a coil circuit composed of a spiral coil pattern serving as the electrode pattern, and the expansion relaxation portion is formed from a magnetic powder resin which serves as the mixed member and in which a magnetic powder is mixed into a resin material.

[4. The electronic component according to claim 2, wherein the internal electrode is provided with an exposed end surface portion exposed at the end surface of the laminate, and the expansion relaxation portion is configured to extend in the length direction of the exposed end surface portion in such a way as to overlap a region constituting 70% or more of the exposed end surface portion.]

5. The electronic component according to claim 2, wherein [the expansion relaxation portion comprises a mixed member in which a ceramic powder constituting the ceramic substrate and a resin material constituting the resin insulating layer are mixed] *the expansion relaxation portions are configured to extend in the length direction of the exposed end surface portions in such a way as to overlap a region constituting 70% or more of the exposed end surface portions.*

[6. The electronic component according to claim 5, wherein the internal electrode is provided with an exposed end surface portion exposed at the end surface of the laminate, and the expansion relaxation portion is configured to extend in the length direction of the exposed end surface portion in such a way as to overlap a region constituting 70% or more of the exposed end surface portion.]

7. The electronic component according to claim [6] *5*, wherein the ceramic substrate is formed from a magnetic substrate comprising a magnetic material, the internal circuit is formed from a coil circuit composed of a spiral coil pattern serving as the electrode pattern, and the expansion relaxation portion is formed from a magnetic powder resin which serves as the mixed member and in which a magnetic powder is mixed into a resin material.

8. The electronic component according to claim 7, wherein the ceramic substrate is formed from a magnetic substrate comprising a magnetic material, the internal circuit is formed from a common mode choke coil circuit in which two spiral coil patterns serving as the electrode patterns are disposed while being opposed to each other in the thickness direction, and the expansion relaxation portion is formed by using a magnetic powder resin which serves as the mixed member and in which a magnetic powder is mixed into a resin material.

9. The electronic component according to claim 1, wherein [the expansion relaxation portion comprises a mixed member in which a ceramic powder constituting the ceramic substrate and a resin material constituting the resin insulating layer are mixed] *the expansion relaxation portions are configured to extend in the length direction of the exposed end surface portions in such a way as to overlap a region constituting 70% or more of the exposed end surface portions.*

10. The electronic component according to claim 9, wherein the ceramic substrate is formed from a magnetic substrate comprising a magnetic material, the internal circuit is formed from a coil circuit composed of a spiral coil pattern serving as the electrode pattern, and the expansion relaxation portion is formed from a magnetic powder resin which serves as the mixed member and in which a magnetic powder is mixed into a resin material.

[11. The electronic component according to claim 9, wherein the internal electrode is provided with an exposed end surface portion exposed at the end surface of the laminate, and the expansion relaxation portion is configured to extend in the length direction of the exposed end surface portion in such a way as to overlap a region constituting 70% or more of the exposed end surface portion.]

[12. The electronic component according to claim 11, wherein the ceramic substrate is formed from a magnetic substrate comprising a magnetic material, the internal circuit is formed from a coil circuit composed of a spiral coil pattern serving as the electrode pattern, and the expansion relaxation portion is formed from a magnetic powder resin which serves as the mixed member and in which a magnetic powder is mixed into a resin material.]

13. The electronic component according to claim [12] *9*, wherein the ceramic substrate is formed from a magnetic substrate comprising a magnetic material, the internal circuit is formed from a common mode choke coil circuit in which two spiral coil patterns serving as the electrode patterns are disposed while being opposed to each other in the thickness direction, and the expansion relaxation portion is formed by using a magnetic powder resin which serves as the mixed member and in which a magnetic powder is mixed into a resin material.

[14. The electronic component according to claim 1, wherein the internal electrode is provided with an exposed end surface portion exposed at the end surface of the laminate, and the expansion relaxation portion is configured to extend in the length direction of the exposed end surface portion in such a way as to overlap a region constituting 70% or more of the exposed end surface portion.]

[15. The electronic component according to claim 14, wherein the ceramic substrate is formed from a magnetic substrate comprising a magnetic material, the internal circuit is formed from a coil circuit composed of a spiral coil pattern serving as the electrode pattern, and the expansion relaxation portion is formed from a magnetic powder resin which serves as the mixed member and in which a magnetic powder is mixed into a resin material.]

16. The electronic component according to claim 1, wherein the ceramic substrate is formed from a magnetic substrate comprising a magnetic material, the internal circuit is formed from a coil circuit composed of a spiral coil pattern serving as the electrode pattern, and the expansion relaxation portion is formed from a magnetic powder resin which serves as the mixed member and in which a magnetic powder is mixed into a resin material.

17. The electronic component according to claim 16, wherein the resin insulating layers are provided with the expansion relaxation portions located on the outer perimeter side of the coil pattern, and a core portion located on the center side of the coil pattern and formed from the magnetic powder resin.

18. The electronic component according to claim 16, wherein the ceramic substrate is formed from a magnetic substrate comprising a magnetic material, the internal circuit is formed from a common mode choke coil circuit in which two spiral coil patterns serving as the electrode patterns are disposed while being opposed to each other in the thickness direction, and the expansion relaxation portion is formed by using a magnetic powder resin which serves as the mixed member and in which a magnetic powder is mixed into a resin material.

19. The electronic component according to claim 1, wherein the ceramic substrate is formed from a magnetic substrate comprising a magnetic material, the internal circuit is formed from a common mode choke coil circuit in which two spiral coil patterns serving as the electrode patterns are disposed while being opposed to each other in the thickness direction, and the expansion relaxation portion is formed by using a magnetic powder resin which serves as the mixed member and in which a magnetic powder is mixed into a resin material.

20. The electronic component according to claim 19, wherein the resin insulating layers are provided with the expansion relaxation portions located on the outer perimeter side of the coil pattern, and a core portion located on the center side of the coil pattern and formed from the magnetic powder resin.

* * * * *